United States Patent [19]

Steele et al.

[11] Patent Number: 5,923,507
[45] Date of Patent: Jul. 13, 1999

[54] MAGNETIC HEAD-TO-MEDIUM BACKER DEVICE

[75] Inventors: Jeffrey M. Steele; Alan T. Brewen, both of Pittsford; Patrick J. Argento, Rochester, all of N.Y.

[73] Assignee: Eastman Kodak Company, Rochester, N.Y.

[21] Appl. No.: 08/739,368

[22] Filed: Oct. 29, 1996

[51] Int. Cl.⁶ .................................................. G11B 15/62
[52] U.S. Cl. ....................................................... 360/130.32
[58] Field of Search ............................. 360/93, 104–106, 360/130.3–130.33

[56] References Cited

U.S. PATENT DOCUMENTS

| | | | |
|---|---|---|---|
| 2,644,690 | 7/1953 | Krag | 274/4 |
| 2,873,318 | 2/1959 | Moore | 179/100.2 |
| 3,372,938 | 3/1968 | Hoag | 274/11 |
| 3,378,266 | 4/1968 | Karecki | 274/11 |
| 3,405,945 | 10/1968 | Braeth | 360/3 |
| 3,648,941 | 3/1972 | Merry | 360/93 |
| 4,161,758 | 7/1979 | Wray | 360/90 |
| 4,297,735 | 10/1981 | Eppich | 360/104 |
| 4,330,802 | 5/1982 | Kato et al. | 360/96.6 |
| 4,370,035 | 1/1983 | Stella | 352/78 R |
| 4,376,962 | 3/1983 | Gunschmann et al. | 360/130.32 |
| 4,451,864 | 5/1984 | Prodinger | 360/130.33 |
| 4,638,392 | 1/1987 | Akutsu | 360/130.32 |
| 4,663,687 | 5/1987 | Dalziel | 360/130.32 |
| 4,747,007 | 5/1988 | Ikebe et al. | 360/132 |
| 4,780,782 | 10/1988 | Bordignon | 360/130.31 |
| 5,016,030 | 5/1991 | Dwyer et al. | 354/21 |
| 5,274,522 | 12/1993 | Taillie | 360/130.3 |
| 5,285,324 | 2/1994 | Weigand et al. | 360/3 |
| 5,285,325 | 2/1994 | Kiesow | 360/3 |
| 5,291,362 | 3/1994 | Kato | 360/106 |
| 5,351,102 | 9/1994 | Tsuji et al. | 354/106 |
| 5,353,078 | 10/1994 | Aoshima | 354/105 |
| 5,561,573 | 10/1996 | Morita | 360/132 |
| 5,576,916 | 11/1996 | Ryan et al. | 360/130.31 |
| 5,598,310 | 1/1997 | Rowden et al. | 360/130.32 |

FOREIGN PATENT DOCUMENTS

| | | |
|---|---|---|
| 54-105505 | 1/1978 | Japan . |
| 980154 | 6/1981 | U.S.S.R. . |
| 1152-031 | 4/1985 | U.S.S.R. .......................... 360/130.33 |

*Primary Examiner*—Jefferson Evans
*Attorney, Agent, or Firm*—Gordon M. Stewart; Frank Pincelli

[57] ABSTRACT

A head-to-medium backer device (37) includes a rigid frame (38) supporting an elastically deformable leaf spring (40) for engaging a magnetic medium (16) to urge the medium into contact with a magnetic head (14). The rigid frame supports a pair of attachment elements (42, 44; 52; 54) which secure respective opposite ends (46, 48) of the leaf spring, the attachment elements being configured so that, when the leaf spring is installed therebetween, the leaf spring flexes to form a continuous arc (50) which is convex away from the rigid frame with the opposite ends of the leaf spring being secured against rotation relative to the rigid frame, whereby when the magnetic head is forced against a center portion of the arc, the center portion can be flexed toward the rigid frame while the opposite ends of the leaf spring remain fixedly secure against rotation relative to the frame.

10 Claims, 3 Drawing Sheets

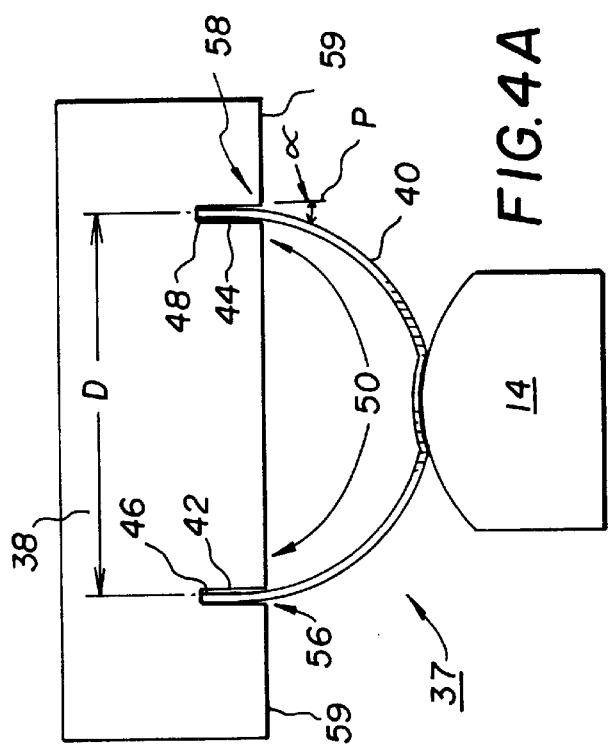
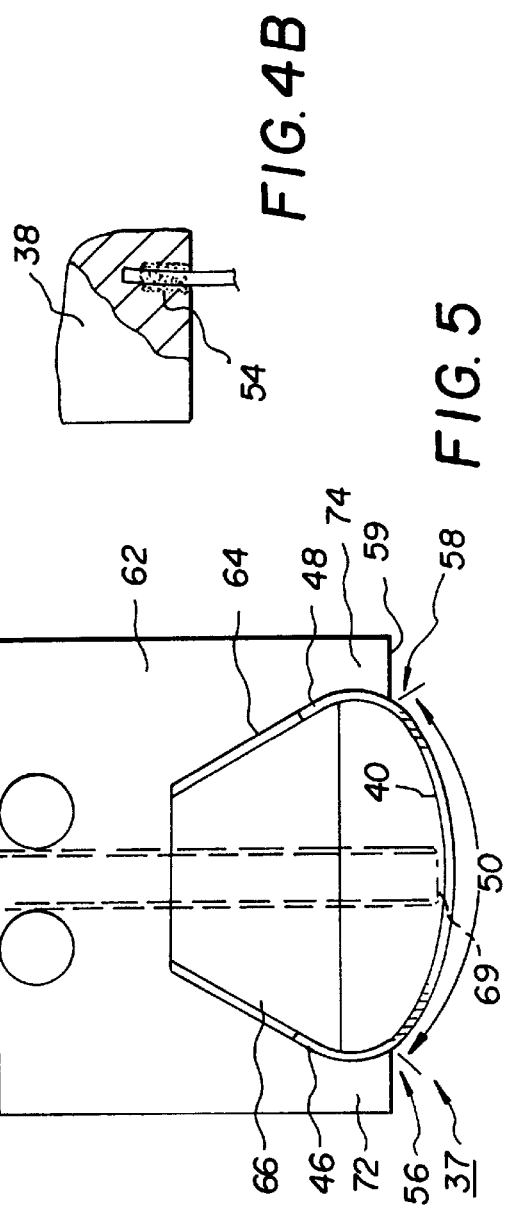
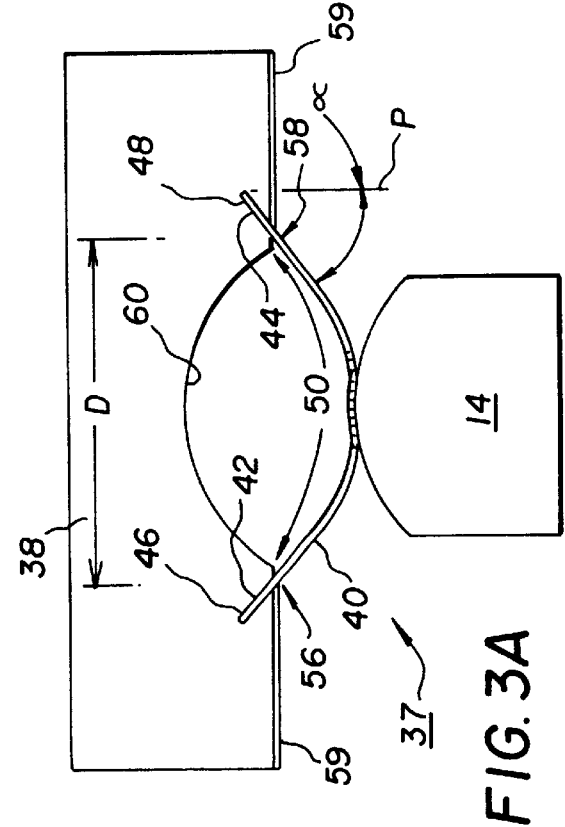
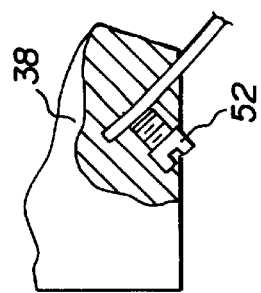

MAGNETIC HEAD-TO-MEDIUM BACKER DEVICE

DESCRIPTION

1. Technical Field

The invention concerns apparatus for magnetic recording. More particularly, the invention relates to apparatus useful for backing a magnetic medium which is in contact with a magnetic read/write head.

2. Background of the Invention

U.S. Pat. No. 5,274,522 discloses a magnetic head-to-medium backer device of the general type shown in FIGS. 1 and 2 of this specification. The backer device may be part of a tape or film cassette; or of a magnetic record/playback apparatus; or of a photographic camera. A magnetic head assembly 10 includes a rigid mounting or backing plate 12 on which a magnetic read/write head 14 is movably mounted. A magnetic medium 16, shown fragmentarily in FIG. 1, is transported past head 14 and during transport is urged into contact with head 14 by a head-to-medium backer assembly 18. Medium 16 may be a conventional magnetic tape or a conventional photographic film having a virtually transparent magnetic coating. Within backer assembly 18, an elastically deformable, reed-like backer 20, such as a small metal leaf spring, is captured in a cavity 22 formed in a rigid mounting block or frame 24. Cavity 22 is defined at least by a pair of opposite, outwardly curved walls 26, 28 which are shaped to hold backer 20 bent in an arc with two opposite leg portions 30, 32 captured within the cavity.

In FIG. 2, backer 20 is shown in dashed lines in a shape it assumes when initially flexed and inserted into cavity 22. For ease of illustration, medium 16 is not shown; and head 14 is shown displaced from its normal operating position in close proximity to backer 20. When a cylindrical contact face of head 14 is pressed into contact with medium 16, the medium moves into contact with a center portion 34 of backer 20. Then the backer deforms to the solid line position of FIG. 2, in which leg portions 30, 32 are deformed away from each other into contact with opposite walls 26, 28 of cavity 22 and center portion 34 just extends from the cavity through an opening 36. In use of assembly 10, medium 16 is threaded between head 14 and backer 20. Head 14 typically is fixedly mounted to backing plate 12 in a position chosen to allow backer 20 to flex sufficiently to permit the medium to be threaded between the backer and the head. The resiliency of the backer is relied upon to ensure proper engagement between the head and medium for magnetic recording or reading, as medium 16 is drawn through head assembly 10. The position of head 14 remains fixed relative to backer 20 as medium 16 is transported through the assembly.

While the assembly of FIGS. 1 and 2 has performed successfully in a variety of applications, problems occasionally have arisen. Some recording media, particularly the photographic film mentioned previously, may become somewhat sticky under certain environmental conditions of temperature and humidity. If this happens, movement of medium 16 across backer 20 at moderately high speeds may cause the backer to rotate within cavity 22, which will cause center portion 34 to move in and out of engagement with the medium. This movement essentially eliminates the desired intimate engagement among backer 20, medium 16 and head 14, leading to poor recording or reading of magnetic information.

Backer devices are known in which a backer spring is fixedly mounted at its opposite ends. For example, U.S. Pat. No. 5,285,324 discloses a backing plate which defines a set of U-shaped material support segments or springs. A similar arrangement is shown in published Russian Inventor's Certificate No. 980,154A. In the relaxed state before the support segments are engaged with a magnetic head, the central portion of the U-shape is flat and the legs of the U-shape are attached at their ends to a support. When the flat central portions of the segments press a magnetic medium into engagement with a head, they are shown to deform concavely. Applicants have learned, however, that due to the initial flatness of such central portions, engaging the flat central portions with a magnetic medium to press the medium against a typically cylindrical contact surface of a head does not reliably produce sufficient contact between the head and medium to ensure good reading or writing of magnetic data. Experiments have shown that initially a flat backer appears to establish line contact between the medium and the head. However, further deflection of the backer tends to cause the backer to deflect away from the initial line of contact and to establish a pair of lines of contact on either side of the recording gap of the head. This leads to poor quality reading or writing of magnetic data.

In some applications of assembly 10, such as in photographic printers, many relatively short lengths of medium 16 are spliced together longitudinally and transported through assembly 10 at moderately high speeds. Typically, splices are formed with strips of tape extended between adjacent lengths of medium. As a result, an increased thickness is encountered by assembly 10 as each splice moves past. The fixed position of head 14 relative to backer 20 during operation provides limited compliance for the splices, due to further deflection of backer 20. For example, backer 20 might be configured to pass splices up to 0.020 inch (0.504 mm) thick. However, when thicker splices are encountered, there is a likelihood that some percentage of the thicker splices will jam in assembly 10 and cause significant damage to the recording medium and the components of assembly 10.

Reliance on the geometry and material properties of backer 20 to ensure proper engagement between medium 16 and head 14 necessarily requires very tight specifications of parameters such as thickness, length, width and material properties for the leaf spring, plus tight specifications on the radius of curvature of the contact face of magnetic head 14. Assembly and adjustment of the backer to the magnetic head can be difficult and time-consuming.

Although head 14 can be moved slightly to loosen its engagement with backer 20, the resultant clearance between the head and the backer remains quite small, being only on the order of a few thousandths of an inch (hundredths of a millimeter). Thus, when head 14 requires cleaning or inspecting, the entire assembly 10 needs to be removed from the transport system of the associated apparatus and then disassembled.

SUMMARY OF THE INVENTION

The objectives of the invention are to provide an improved magnetic head assembly and backer assembly which solve the problems just mentioned.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A head-to-medium backer device according to the invention includes a rigid frame supporting an elastically deformable leaf spring for engaging a magnetic medium to urge the medium into contact with a magnetic head. The backer device is characterized by the rigid frame's supporting a pair of attachment elements which secure respective opposite ends of the leaf spring. The attachment elements are configured so that, when the leaf spring is installed therebetween, the leaf spring flexes to form a continuous arc which is convex away from the rigid frame with the opposite ends of the leaf spring being secured against rotation relative to the rigid frame. As a result, when a magnetic head is forced against a center portion of the arc, the center portion can be flexed toward the rigid frame while the opposite ends of the leaf spring remain fixedly secure against rotation relative to the frame.

The invention provides various advantages. Since the ends of the leaf spring of the backer assembly are fixed to a rigid frame or mounting block, rotation of the leaf spring is prevented during use of the assembly, thus ensuring good engagement among the head, the medium and the leaf spring. The complex cavity of the prior art backer assembly is eliminated. The leaf spring should not undergo a permanent, plastic deformation during assembly or use; so that, the properties of the spring should remain more consistent during use, other than for changes caused by wear. And, the likelihood of damaging the leaf spring during assembly should be reduced, since plastic deformation is not required. Considerable design latitude is anticipated since the mechanical properties of the leaf spring, the angle between the leaf spring and the rigid frame or mounting block, and the working length of the leaf spring can be selected depending on the desired contact area and pressure distribution among the leaf spring, the medium and the head. Thicker splices are readily accommodated due to the added compliance of the mount for the backer assembly. The adjustability of the mount for the backer assembly should allow for some relaxation of the specifications of the leaf spring and its attachment to the mounting block, since the deflection of the bias spring of the mount can be adjusted to achieve the desired initial engagement. Due to the adjustability of the mount for the backer assembly, the backer assembly can be easily moved away from the head to allow for cleaning or inspecting, without requiring any disassembly.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 3A shows a schematic elevation view of one embodiment of a magnetic head assembly according to the invention.

FIG. 3B shows a fragmentary, partially sectional view of one side of the assembly of FIG. 3A, including a mechanical clamp attachment.

FIG. 4A shows a schematic elevation view of another embodiment of a magnetic head assembly according to the invention.

FIG. 4B shows a fragmentary, partially sectional view of one side of the assembly of FIG. 4A, including a spot weld attachment.

FIG. 5 shows an elevation view of a one embodiment of a magnetic head-to-medium backer according to the invention.

DESCRIPTION OF THE PERFERRED EMBODIMENTS

Figure 2:
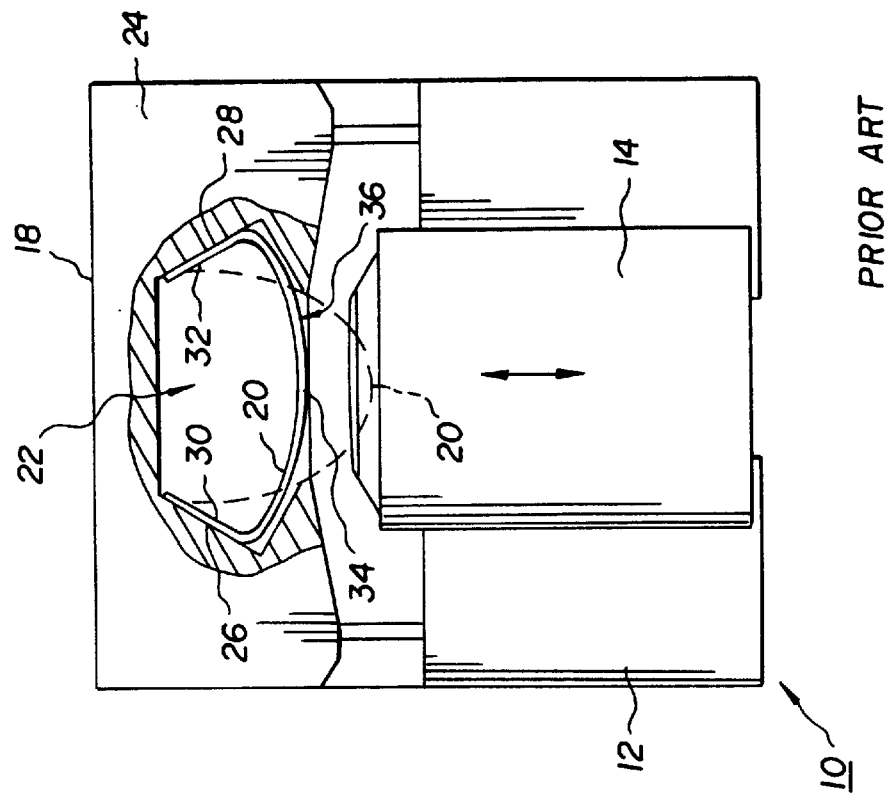
FIG. 2 shows an elevation view, partially broken away, of the assembly of FIG. 1.

The following is a detailed description of the preferred embodiments of the invention, reference being made to the drawings in which the same reference numerals identify the same elements of structure in each of the several Figures.

Figure 1:
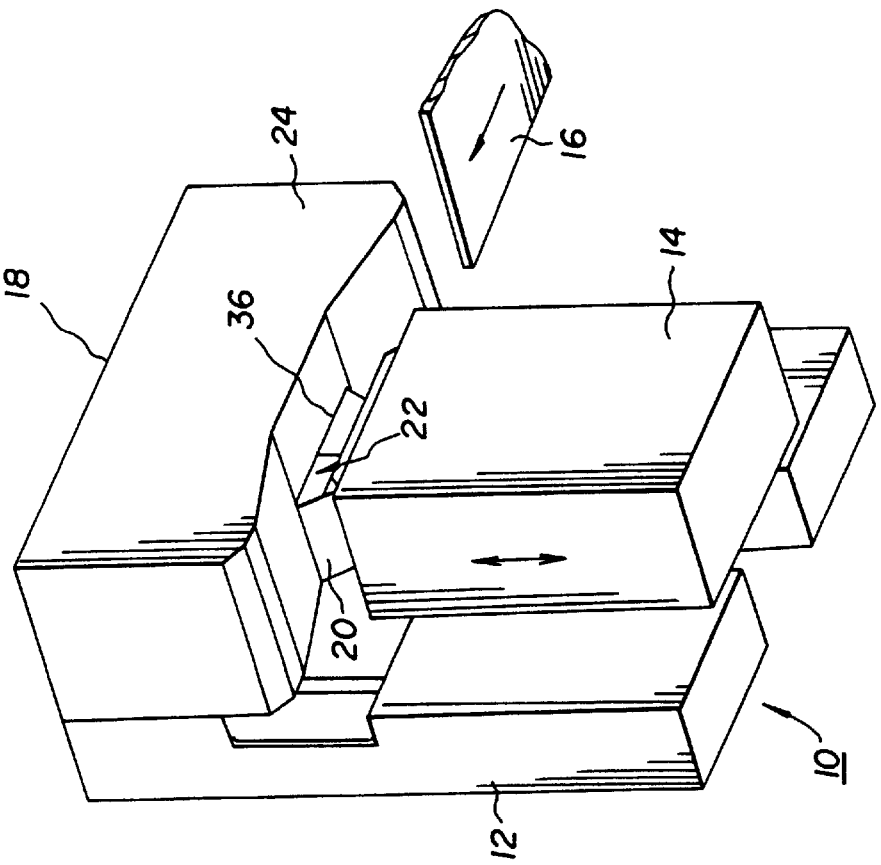
FIG. 1 shows a perspective view of a prior art magnetic head assembly.

FIGS. 3 to 5 show embodiments of a head-to-medium backer assembly 37 according to the present invention. In the embodiment of FIGS. 3A and 4A, a rigid frame or mounting block 38 supports an elastically deformable leaf spring 40 by means of a pair of attachment elements, such as slots 42, 44 formed in frame 38. To assemble the device, leaf spring 40 is elastically flexed and its opposite ends 46, 48 are slipped into slots 42, 44. Preferably, leaf spring 40 is sufficiently long for ends 46, 48 to reach the bottoms of their respective slots. The slots may be 0.040 to 0.120 inch (1.02 to 3.06 mm) deep. The slots may extend in convergent directions from the frame, as shown in FIG. 3A; in essentially parallel directions, as shown in FIG. 4A; or in divergent directions, not illustrated. To avoid accidental removal of the leaf spring, the opposite ends may be anchored in the slots by a suitable cement or by tight tolerances. Thus, without plastic deformation, flexed leaf spring 40 forms a continuous arc, convex away from frame 38. Due to the essentially cantilever support thus provided at each end of the leaf spring, the ends are secured against rotation relative to frame 38. This prevents rotation of the backer spring and loss of engagement, as sometimes has been experienced with the assembly of FIGS. 1 and 2. As alternatives to slots 42, 44, those skilled in the art will appreciate that attachment elements such as a mechanical clamp or set screw 52 shown schematically in FIG. 3B or a spot welded joint shown schematically in FIG. 4B could be provided at each end of the leaf spring. As a further alternative, the outer edges of the slots might be crimped, not illustrated.

When head 14 is urged against the center of the arch of leaf spring 40, as shown in FIGS. 3A and 4A, the leaf spring initially establishes line contact and then flexes to form a short central concavity where the spring contacts the head. Good contact is made across the central concavity, thereby applying a steady pressure to the head. Though medium 16 is not shown between the backer spring and the head in FIGS. 3A and 4A, those skilled in the art will appreciate that when the medium is present, the spring deflects in the manner just described to ensure that the medium makes sufficient contact with the head to ensure good reading or writing of magnetic data. Because ends 46, 48 are secured against rotation relative to frame 38, movement of the medium through the device in either direction does not cause loss of contact.

For a leaf spring 40 having given length, width, thickness, and material properties, the amount the spring must be flexed at assembly will influence the stiffness of the spring in backer assembly 37. At locations 56, 58 where leaf spring 40 extends from frame 38, an angle α is formed between (a) slots 42, 44 and leaf spring 40 and (b) perpendicular P to a reference plane surface 59 on frame 38. Angle a extends between perpendicular P and a longitudinal centerline through slots 42, 44 and leaf spring 40. The stiffness is also influenced by the distance D measured directly between locations 56, 58; and by the working length of the leaf spring, measured along the spring between locations 56, 58. In general, the more that leaf spring 40 is flexed from a flat configuration, the greater will be its stiffness. Considerable design latitude is allowed to control the stiffness, by varying distance D, the working length, and angle α, along with varying the mechanical and material properties of the leaf spring. A recess 60 may be provided in frame 38, if necessary to accommodate movement of the leaf spring during engagement with the magnetic head, such as to pass an especially thick splice.

FIG. 5 shows another embodiment of backer assembly 37. A rigid clamp block or frame 62 defines an essentially trapezoidal pocket 64 which is open to one side. Within pocket 64 a geometrically similar clamping insert 66 is secured by a locking screw 68. During assembly, ends 46, 48 of leaf spring 40 are inserted between insert 66 and the opposite walls of pocket 64. Screw 68 is then rotated to draw insert 66 into tight clamping engagement with ends 46, 48, leaving a continuous arc of the leaf spring extended from the open side of pocket 64, as illustrated. In use of this embodiment, a free end 69 of locking screw 68 can act as a stop against excessive flexing of spring 40. Contact of the spring with the free end would indicate a need for replacement of the spring. Outboard of insert 66, pocket 64 may be provided with abutments or stops 72, 74, which limit movement of spring 40 during high friction conditions.

In actual embodiments of the invention, leaf spring 40 was made from steel, though brass, copper or molybdenum also could be used. The steel had a modulus of elasticity of $30 \times 10^6$ psi (205 MPa), though materials exhibiting a modulus over a range of about 12 to $50 \times 10^6$ psi (82 to 340 MPa) would be workable. Actual thicknesses of the spring were 0.0015 and 0.0020 inch (0.038 and 0.051 mm), though a range of about 0.001 to 0.004 inch (0.025 to 0.102 mm) would be practical. Actual width of the spring, as measured into the page of FIG. 3A, was 0.108 inch (2.75 mm), though a range of about 0.039 to 0.394 inch (1.0 to 10.0 mm) would be useful for various applications. Distance D was 0.472 inch (12.0 mm), but a range of about 0.354 to 0.787 inch (9.0 to 20.0 mm) would be acceptable. Leaf working length between locations 56, 58 is a function of angle α and distance D. For D equal to about 0.472 inch (12.0 mm), the working length was 15.2 mm when angle a was 60 degrees, and was 20.0 mm when angle α was zero degrees. Angle α was tested at 75, 60 or zero degrees; but a range of about 85 to minus 20 (divergent slots) degrees would be practical. For D in the range of 0.354 to 0.787 inch (9 to 20 mm) and angle a in the range of 85 to minus 20 degrees, the leaf working length would be in a range of about 0.393 to 1.181 inch (10.0 to 30.0 mm). The actual devices were tested with an applied force of 2.99 ounces (85 grams) applied between head 14 and leaf spring 40, though a force range of 1.41 to 4.23 ounces (40 to 120 grams) would be practical in actual operation. Acceptable reproduced pulse widths were measured on medium 16.

Figure 6:
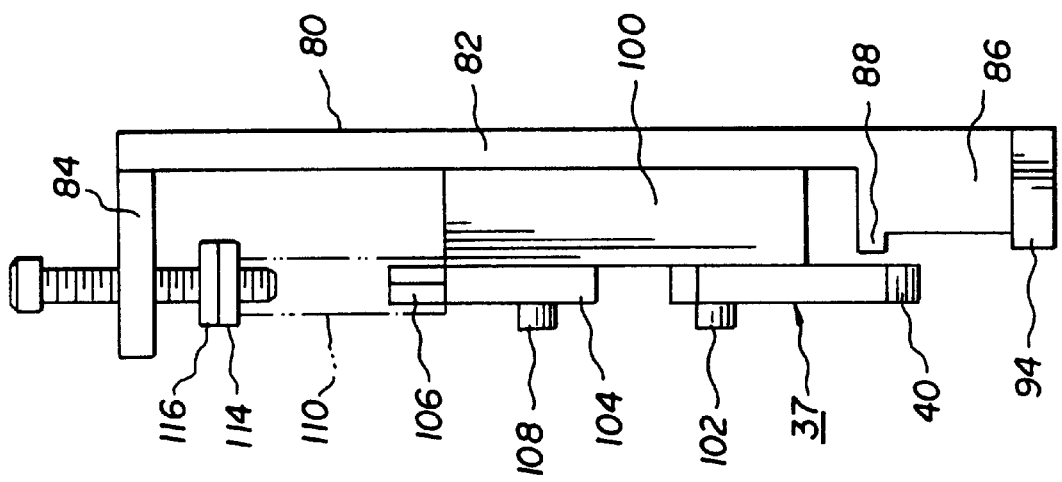
FIG. 6 shows a front elevation view of a magnetic head assembly according to the invention.
Figure 7:
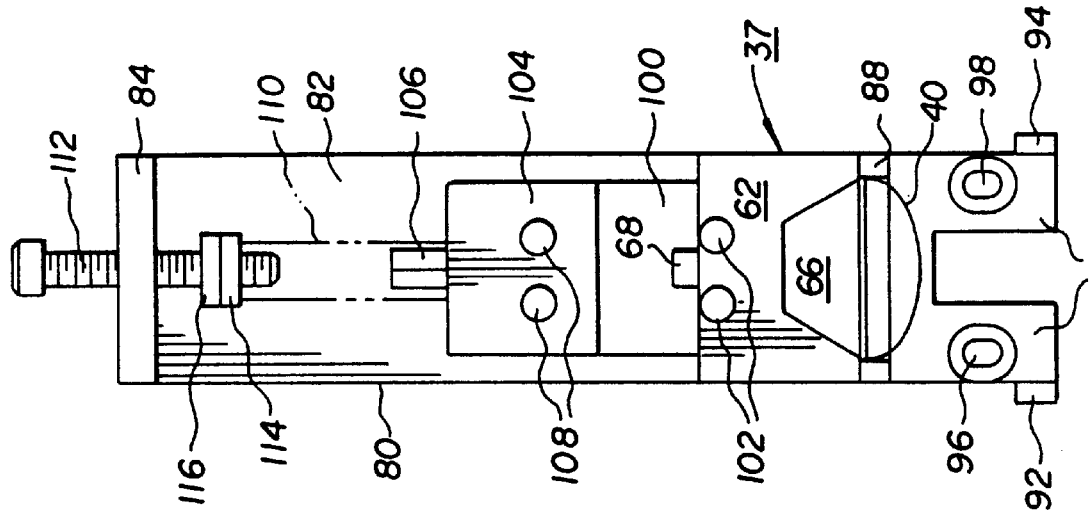
FIG. 7 shows a side elevation view of the assembly of FIG. 6.

FIGS. 6 and 7 show a magnetic recording head assembly according to the invention. A rigid mounting frame 80 comprises a back plate 82 and a transversely extended top mounting flange 84. At the opposite end of plate 82, a pair of bottom mounting legs 86 are provided. Above legs 86, a transverse stop flange 88 is provided for limiting the uppermost location of the magnetic head, not illustrated. Head 14 would be mounted between a pair of spaced alignment tabs 92, 94 at the ends of legs 86 by means of a pair of fasteners, not illustrated, extended through bores 96, 98 in the legs.

Above flange 88, a conventional linear slide assembly or carrier 100 is fixedly attached to back plate 82. A pair of fasteners 102 secure backing assembly 37 to a lower end of the slider in assembly 100. A spring retainer plate 104 supports a spring retainer post 106 and is secured to an upper end of the slider in assembly 100 by a pair of fasteners 108. A compression spring 110, shown by dashed lines only, is retained at a lower end by post 106 and at an upper end by an adjustment screw 112 threaded through top mounting flange 84. Those skilled in the art will appreciate that the characteristics of spring 110 would be selected to provide the desired loading force against the magnetic head. An adjusting nut 114 and locking nut 116 are threaded onto screw 112 above spring 110 to allow for adjustment of the bias applied by spring 110 to backing assembly 37. Assembly and adjustment are therefor simpler and quicker than for the device of FIGS. 1 and 2. Thus, in use, the force applied to a medium passing between spring 40 and magnetic head 14 will be a combination of the bias forces of spring 110 and spring 40. Thus, design specifications and tolerances for both springs can be less restrictive than with prior art backer assemblies. This assembly permits passage of thicker splices, while still maintaining a suitable force of engagement between the head and the medium. This assembly may be used with the backer spring assembly of FIGS. 1 and 2 or that of FIGS. 3 to 5. And, by simply manually lifting backer assembly 37 against the force of spring 112, sufficient access is provided for cleaning or inspecting head 14.

Parts List

| | |
|---|---|
| 10 . . . magnetic head assembly | 64 . . . trapezoidal pocket |
| 12 . . . mounting or backing plate | 66 . . . clamping insert |
| 14 . . . magnetic head | 68 . . . locking screw |
| 16 . . . magnetic medium | 69 . . . free end of 68 |
| 18 . . . head-to-medium backer assembly of prior art | 72, 74 . . . stop outboard of 66 |
| | 80 . . . rigid mounting frame |
| 20 . . . elastically deformable, read-like backer | 82 . . . back plate |
| | 84 . . . top mounting flange |
| 22 . . . cavity | 86 . . . bottom mounting legs |
| 24 . . . rigid mounting block or frame | 88 . . . transverse stop |
| 26, 28 . . . opposite, outwardly curved walls of 22 | 92, 94 . . . spaced alignment tabs |
| | 96, 98 . . . bores for fasteners for 14 |
| 30, 32 . . . opposite leg portions of 20 | 100 . . . linear slide assembly or carrier |
| 34 . . . center portion of 20 | |
| 36 . . . opening from 22 toward 14 | 102 . . . fasteners between 37 and 100 |
| 37 . . . head-to-medium backer assembly of invention | 104 . . . spring retainer plate |
| 38 . . . rigid frame | 106. . . spring retainer post |
| 40 . . . elastically deformable leaf spring | 108 . . . fasteners between 104 and 100 |
| 42, 44 . . . slots into 38 | 110 . . . compression spring |
| 46, 48 . . . opposite ends of 40 | 112 . . . adjustment screw |
| 50 . . . continuous arc | 114 . . . adjusting nut |
| 52 . . . mechanical clamp | 116 . . . locking nut |
| 54 . . . welded joint | |
| α . . . angle of 40 at 56, 58 | |
| 56, 58 . . . locations where 40 exits 42, 44 | |
| 59 . . . reference planar surface of 38 | |
| P . . . perpendicular to 59 | |
| D . . . distance between locations 56, 58 | |
| 60 . . . recess in 38 | |
| 62 . . . rigid clamp block or frame | |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure letters patent for:

1. A head-to-medium backer device includes a rigid frame supporting an elastically deformable leaf spring for engaging a magnetic medium to urge the medium into contact with a magnetic head, and is characterized by:

the rigid frame supporting a pair of attachment elements which secure respective opposite ends of the leaf spring, the attachment elements being configured so that, when the leaf spring is installed therebetween, the leaf spring flexes to form a continuous arc which is convex away from the rigid frame with the opposite ends of the leaf spring being secured on both sides of each end against rotation relative to the rigid frame, whereby when a magnetic head is forced against a center portion of the arc, the center portion can be flexed toward the rigid frame while the opposite ends of the leaf spring remain fixedly secure against rotation relative to the frame, said attachment elements are formed by a pocket in the rigid frame, a clamping insert in the pocket, and means for clamping the insert against respective opposite ends of a lead spring.

2. A device according to claim 1, wherein each attachment element comprises a respective slot formed in the frame, each slot being configured to receive one of the opposite ends and provide cantilevered support to the end to prevent rotation of the end relative to the frame.

3. A device according to claim 2, wherein the opposite ends are cemented into the respective slots.

4. A device according to claim 2, wherein the slots are configured to extend in divergent directions from the frame.

5. A device according to claim 2, wherein the slots are configured to extend in convergent directions from the frame.

6. A device according to claim 2, wherein the slots are configured to extend essentially in parallel directions from the frame.

7. A device according to claim 1, wherein each attachment element comprises a mechanical clamp for holding one of the opposite ends.

8. A device according to claim 1, wherein each attachment element comprises a weld between one of the opposite ends and the frame.

9. A device according to claim 1, further comprising a pair of stops on the rigid frame outboard of the pocket for limiting movement of the spring.

10. A head-to-medium backer device includes a rigid frame supporting an elastically deformable leaf spring for engaging a magnetic medium to urge the medium into contact with a magnetic head, and is characterized by:

the rigid frame supporting a pair of attachment elements which secure respective opposite ends of the leaf spring, the attachment elements being configured so that, when the leaf spring is installed therebetween, the leaf spring flexes to form a continuous arc which is convex away from the rigid frame with the opposite ends of the leaf spring being secured on both sides of each end against rotation relative to the rigid frame, whereby when a magnetic head is forced against a center portion of the arc, the center portion can be flexed toward the rigid frame while the opposite ends of the leaf spring remain fixedly secure against rotation relative to the frame;

and wherein:

the leaf spring is made from a material having a modulus of elasticity in a range of about 82 to 340 MPa; a length measured along the leaf spring between the attachment elements in a range of about 10 to 30 mm; a thickness in a range of about 0.025 to 0.102 mm; a width in a range of about 1.0 to 10.0 mm;

the leaf spring extends from a respective attachment element at an angle in a range of about 85 to about minus 20 degrees, the angle being measured between the leaf spring and a perpendicular to a plane passing through the leaf spring at locations where the leaf spring extends from each attachment element; and a distance measured in the plane between the locations is in a range of about 9.0 to 20.0 mm.

* * * * *